United States Patent
Kiwan et al.

(10) Patent No.: US 11,022,053 B1
(45) Date of Patent: Jun. 1, 2021

(54) METHOD AND SYSTEM FOR PROVIDING ENGINE KNOCK DETECTION DYNAMIC GAINS

(71) Applicant: Ford Global Technologies, LLC, Dearborn, MI (US)

(72) Inventors: Rani Kiwan, Dearborn, MI (US); Lee McQuinn, Lenox, MI (US); Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/893,070

(22) Filed: Jun. 4, 2020

(51) Int. Cl.
| | |
|---|---|
| *F02D 35/02* | (2006.01) |
| *G01M 15/12* | (2006.01) |
| *F02P 5/152* | (2006.01) |
| *F02D 13/02* | (2006.01) |
| *F02D 41/40* | (2006.01) |
| *F02D 41/38* | (2006.01) |

(52) U.S. Cl.
CPC ....... *F02D 35/027* (2013.01); *F02D 13/0203* (2013.01); *F02D 41/401* (2013.01); *F02P 5/152* (2013.01); *G01M 15/12* (2013.01); *F02D 2041/389* (2013.01); *F02D 2200/101* (2013.01)

(58) Field of Classification Search
CPC .. F02D 35/027; F02D 41/401; F02D 13/0203; F02D 2200/101; F02D 2041/389; F02P 5/152; G01M 15/12

USPC .......... 123/406.16, 406.21, 406.29, 406.34, 123/406.37, 406.38, 406.39; 701/103, 701/104, 105, 111; 73/35.07
See application file for complete search history.

(56) References Cited

U.S. PATENT DOCUMENTS

| | | | | |
|---|---|---|---|---|
| 4,481,924 A | * | 11/1984 | Kobayashi | G01L 23/225 73/35.05 |
| 5,284,047 A | * | 2/1994 | Brokaw | G01L 23/225 73/35.07 |
| 6,060,913 A | * | 5/2000 | Vulih | F02D 35/027 327/336 |
| 2020/0318568 A1 | | 10/2020 | Kiwan et al. | |

FOREIGN PATENT DOCUMENTS

DE    4132096 A1    4/1992

* cited by examiner

*Primary Examiner* — Hai H Huynh
(74) *Attorney, Agent, or Firm* — Geoffrey Brumbaugh; McCoy Russell LLP

(57) ABSTRACT

Methods and systems for adjusting engine knock control system dynamic gains are presented. In one example, a plurality of tables or functions output gain values, each of which is adjusted via a unique weighting factor. A rectified and integrated engine knock sensor level is adjusted according to a sum of weighted gain output values of the plurality of tables or functions.

20 Claims, 7 Drawing Sheets

METHOD AND SYSTEM FOR PROVIDING ENGINE KNOCK DETECTION DYNAMIC GAINS

FIELD

The present application relates to methods and systems for detecting and responding to knock of an internal combustion engine.

BACKGROUND/SUMMARY

A knock control system for an internal combustion engine may rectify and integrate output of a knock sensor to determine the presence or absence of engine knock. The rectified and integrated knock sensor signal may also be filtered to generate a reference or background engine noise level signal. The rectified and filtered engine knock sensor signal may be divided by the background noise level signal to determine a knock intensity signal. Finally, the knock intensity signal may be compared to a threshold knock level to determine the presence or absence of engine knock. If engine knock is detected, an engine controller may take mitigating actions to limit engine knock. For example, the engine controller may retard spark timing to reduce the possibility of engine knock.

Engines may also include devices that may interfere with knock detection or make knock detection more difficult because they may generate sounds at engine crankshaft angles where engine knock may be expected. In addition, these devices may generate noises at different crankshaft angles according to engine operating conditions. For example, an engine may include port fuel injectors and direct fuel injectors. The direct fuel injectors may tend to create noise as components of the direct fuel injectors move when the direct fuel injectors open and close. Similarly, poppet valve closings, variable cylinder displacement operation, and engine noise related to rapid engine speed changes and load changes may generate noise that may make accurate detection of knock more difficult. In particular, background engine noise levels may quickly change such that engine knock may not be detected. Alternatively, the background engine noise levels may change causing false indications of engine knock, which may result in a loss of engine fuel efficiency.

The inventors herein have recognized that engine knock detection may be influenced by engine background noise levels that change rapidly and they have developed an engine operating method, comprising: adjusting a rectified and integrated engine knock sensor signal via output of a plurality of gain tables or functions; indicating a presence or an absence of engine knock based on output of the plurality of gain tables or functions; and adjusting an engine actuator to reduce a possibility of engine knock via a controller in response to the presence of engine knock.

By adjusting a rectified and integrated knock sensor signal via a plurality of gain tables or functions, it may be possible to compensate for engine background noise levels that change quickly due to changes in engine operating conditions. In particular, gain tables or functions may be provided to compensate for each individual engine noise source that may influence engine background noise levels. For example, if an engine noise source (e.g., direct fuel injector or poppet valve) adds to engine background noise, then a gain value may be decreased to scale the rectified and integrated knock sensor signal level to a value of one. Conversely, if an engine noise source is removed from engine background noise via deactivating the engine noise source, then a gain value may be increased to scale the rectified and integrated knock signal level base to the value of one. In this way, a plurality of gain tables or functions may compensate for engine noise sources that may operate from time to time or at specific engine speed and engine load conditions.

The present approach may provide several advantages. Specifically, the approach may provide an improved signal to noise ratio, thereby improving engine knock detection for engines that have noise sources that may not operate at all engine speeds and load. Further, the approach may improve engine fuel consumption via reducing a possibility of false engine knock indications. In addition, the approach may provide improved engine knock detection without additional hardware.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
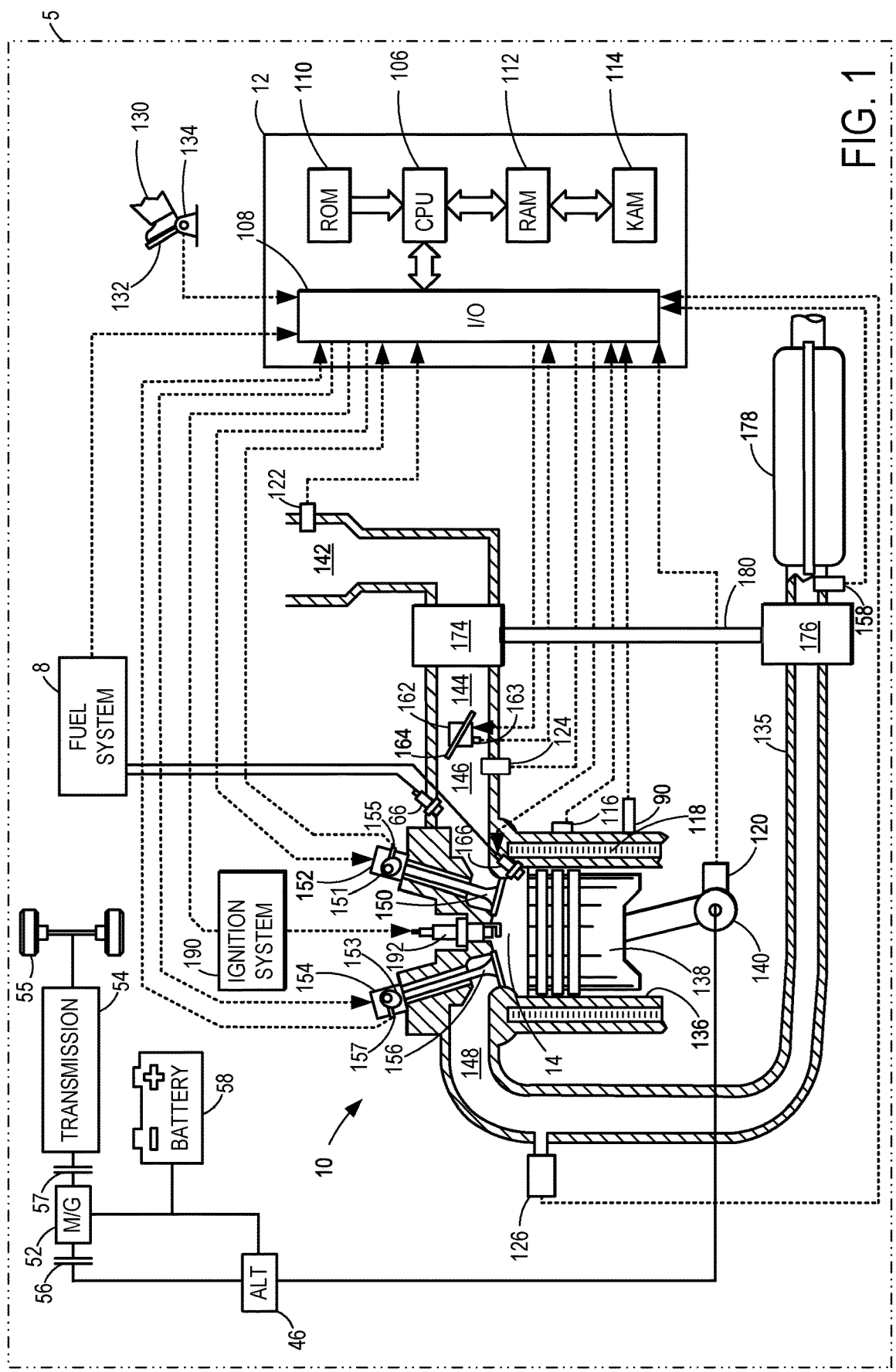
FIG. 1 shows a schematic depiction of an engine system of a vehicle.
Figure 2:
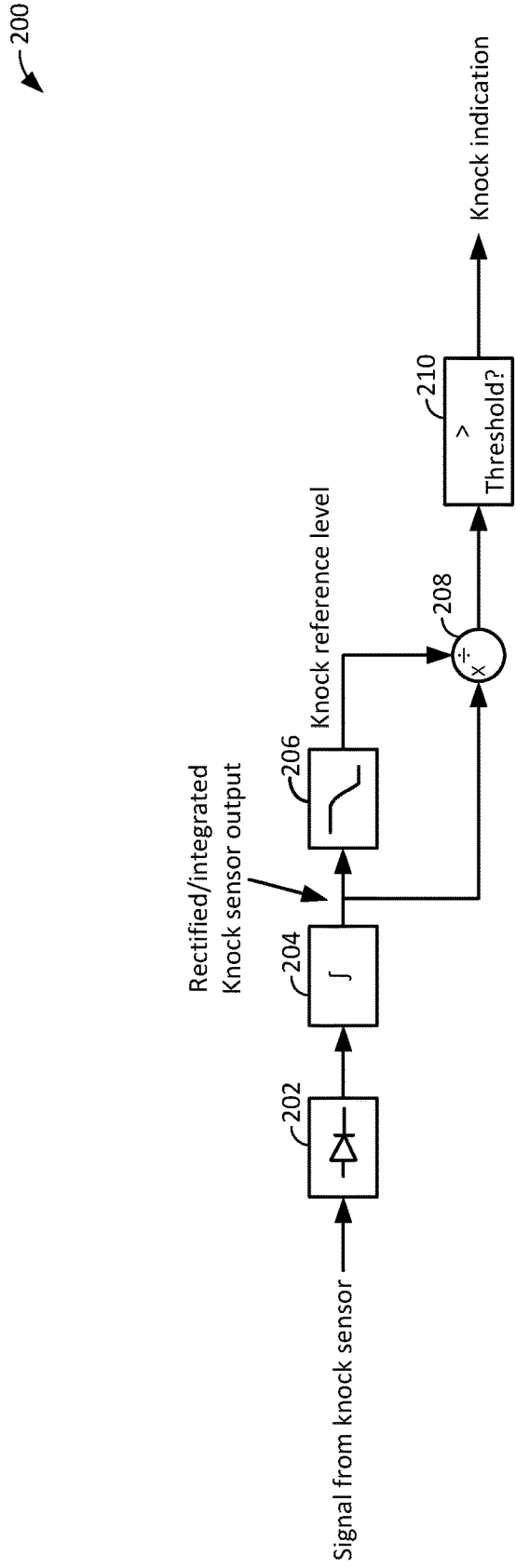
FIG. 2 shows a block diagram of a prior art engine knock detection approach.
Figure 3:
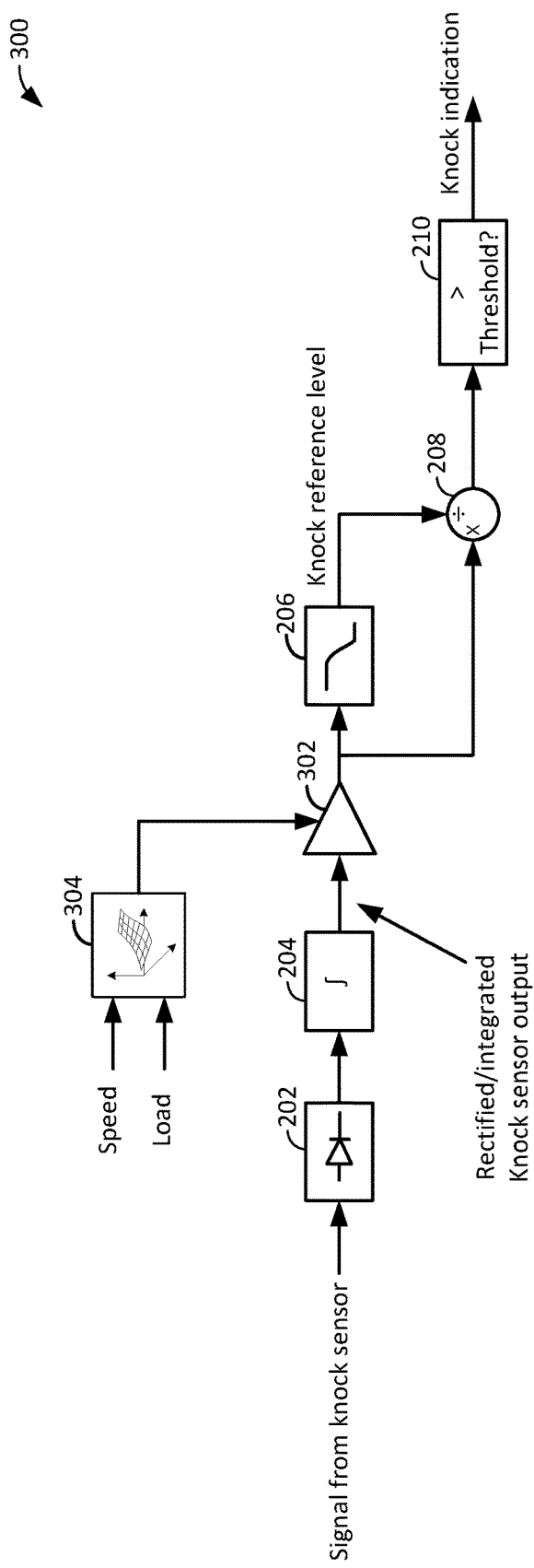
FIG. 3 shows a block diagram of a second prior art engine knock detection approach.
Figure 4:
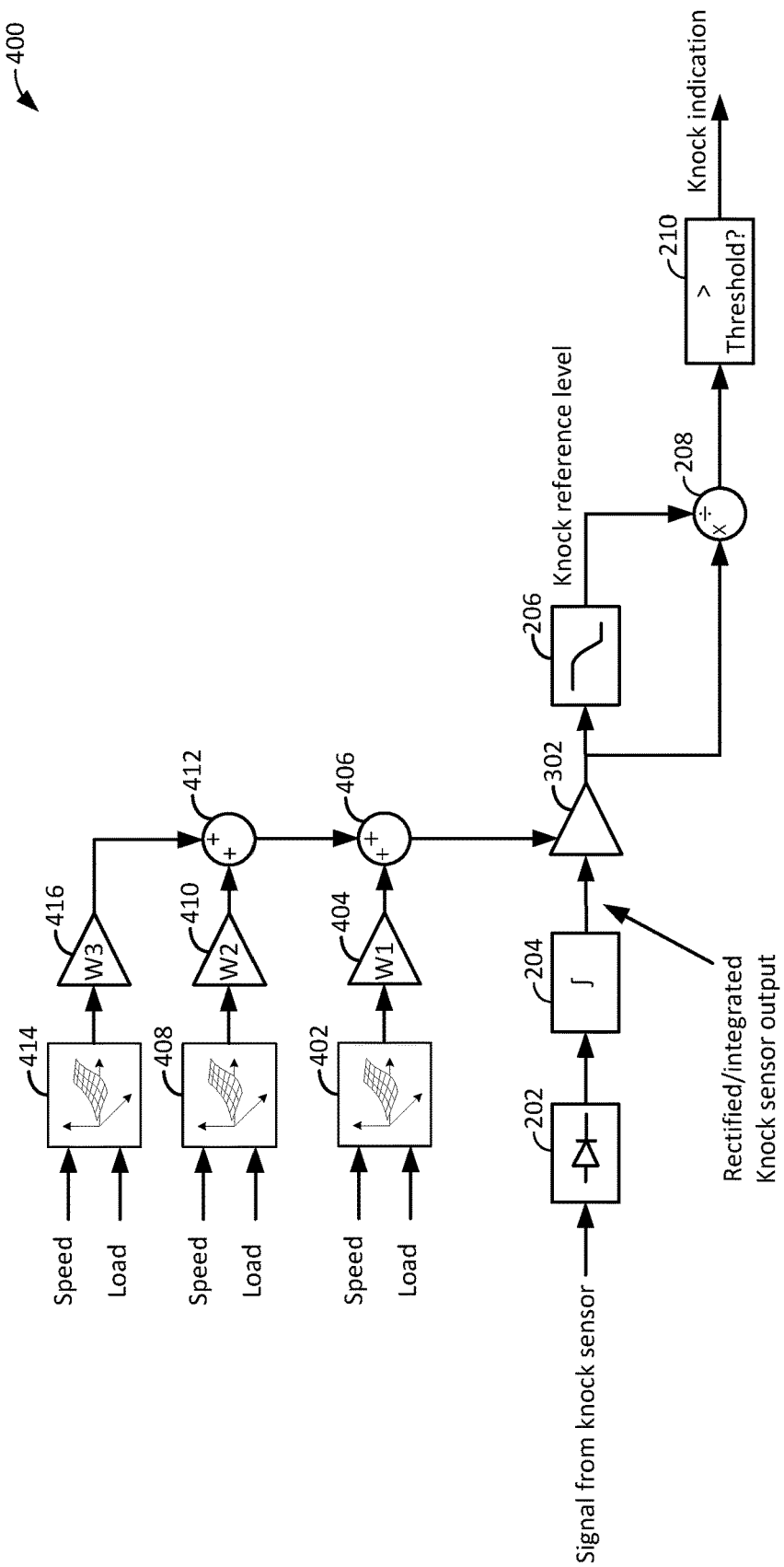
FIGS. 4-6 shows block diagrams of engine knock detection methods according to the present disclosure.
Figure 5:
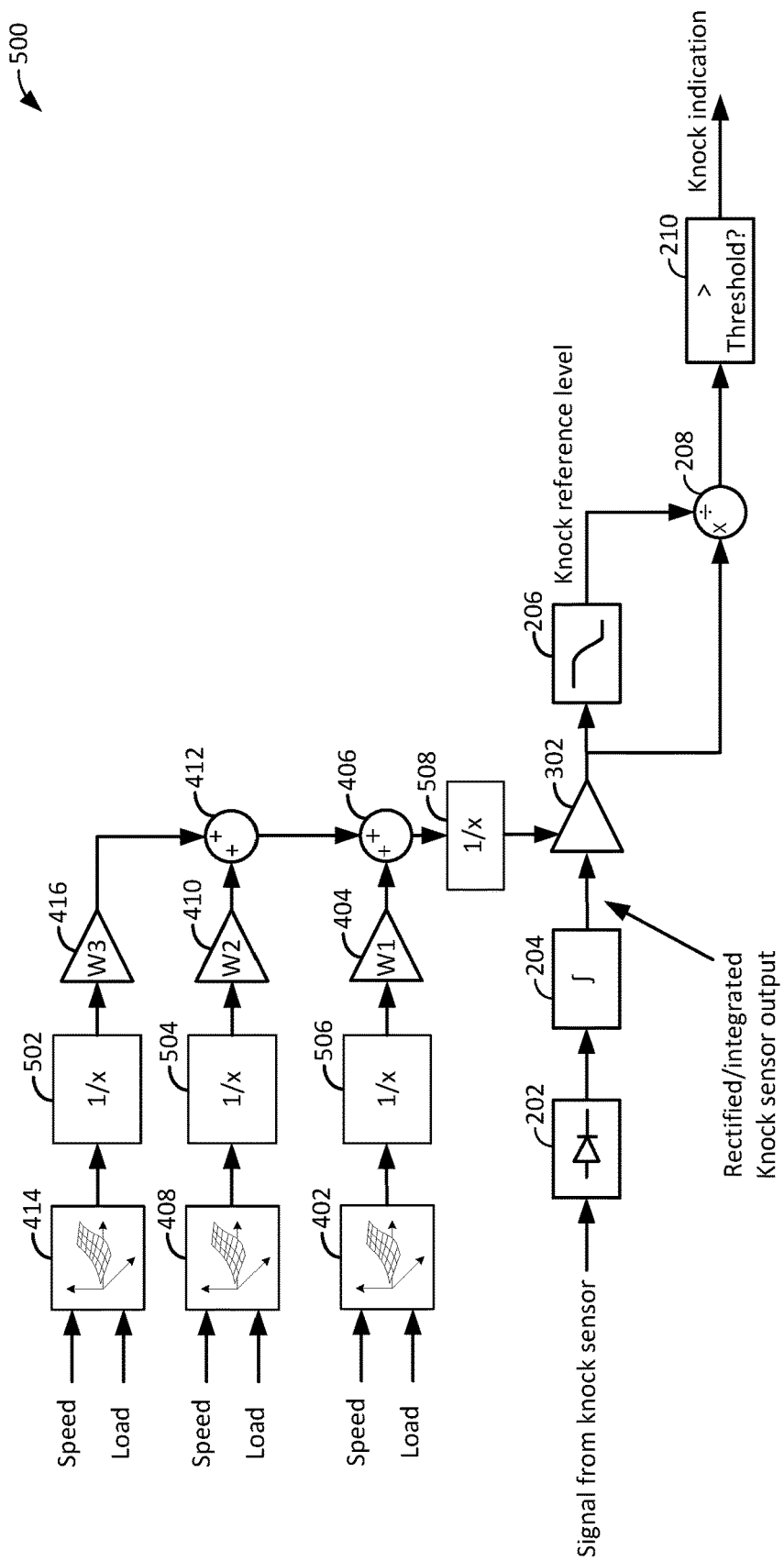
Figure 6:
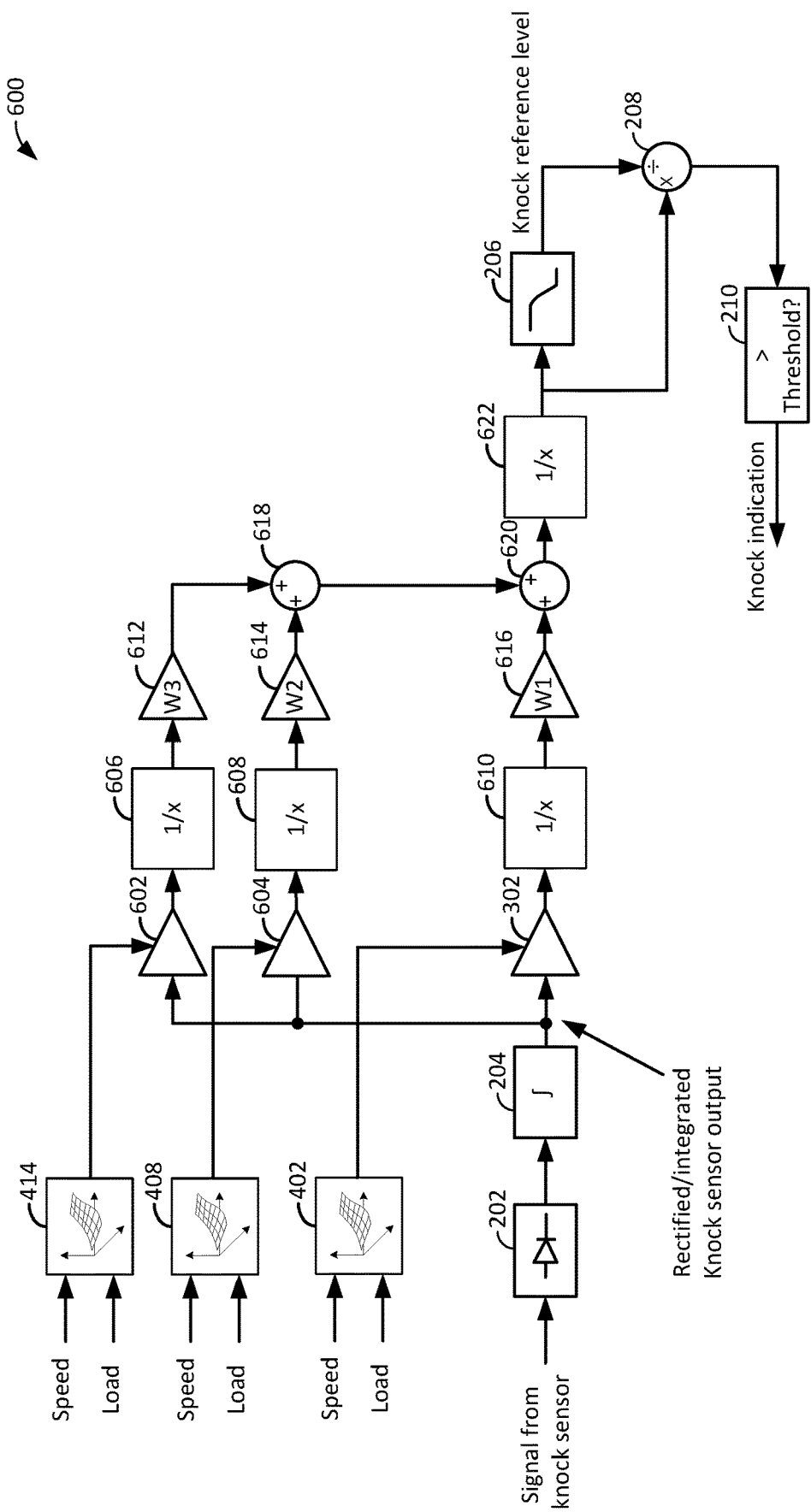
Figure 7:
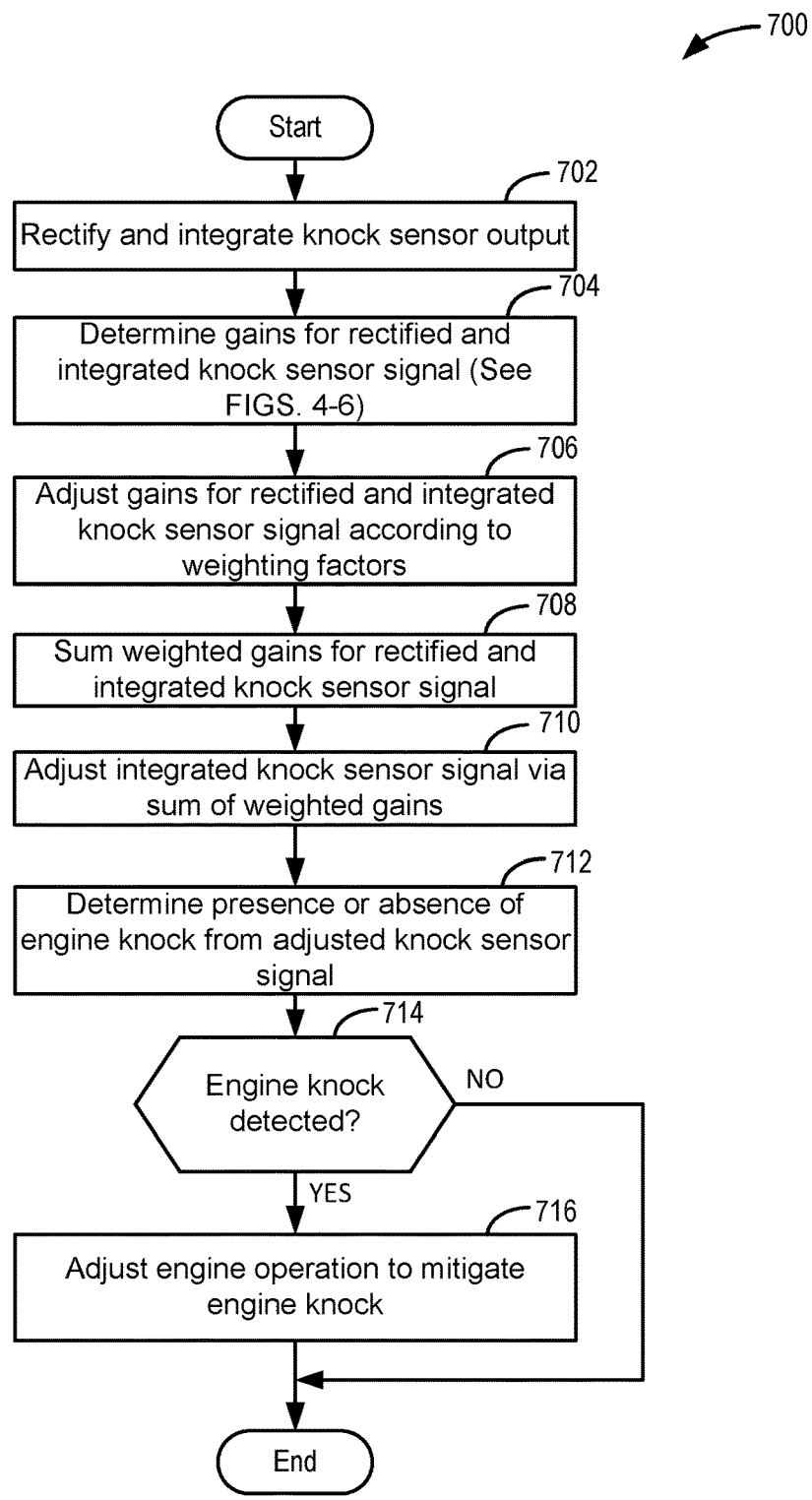
FIG. 7 shows a flowchart of an example engine knock detection method according to the present disclosure.

The following description relates to systems and methods for operating an engine that includes a knock control system. The engine may also include one or more noise sources that may cause the engine to vibrate, thereby changing the engine background or reference noise level. The engine may be of the type that is shown in FIG. 1. Portions of prior art engine knock control systems are shown in FIGS. 2 and 3. Portions of engine knock control systems according to the present description are shown in FIGS. 4-6. A method for operating an engine knock control system is shown in FIG. 7.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via an input device 132. In this example, input device 132 includes a propulsive effort pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown)

may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., knock) via knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Thus, the system of FIG. 1 provides for a system for operating an engine, comprising: an engine including a knock sensor; and a controller including executable instructions stored in non-transitory memory that cause the controller to adjust a rectified and integrated signal output from the knock sensor in response to output of a plurality of weighted outputs of gain tables or functions and indicate a presence or absence of engine knock based on the plurality of weighted outputs of gain tables or functions. The system further comprises additional instructions that cause the controller to adjust operation of the engine in response to the presence of engine knock. The system includes where adjusting operation of the engine includes adjusting engine spark timing. The system further comprises additional instructions to sum output of the plurality of weighted outputs of the gain tables or functions. The system further comprises additional instructions that cause the controller to generate a result via multiplying the sum output of the plurality of weighted outputs of the gain tables or functions with the rectified and integrated signal output from the knock sensor. The system further comprises additional instructions to filter the result and divide the result by the filtered result.

Referring now to FIG. 2, a block diagram 200 that describes a method for operating an engine with a knock control system is shown. A signal from an engine knock sensor (e.g., 90 of FIG. 1) is rectified via block 202. The rectification of the knock sensor signal may be performed via hardware (e.g., electronic circuitry) or via software (e.g., executable instructions stored in a controller). The rectified knock sensor signal is then input to block 204 where it is integrated. In particular, the rectified knock sensor signal is integrated over a particular crankshaft angle interval associated with a cylinder that is being evaluated for presence or absence of engine knock (e.g., engine noise generated by pressure waves in the cylinder being evaluated resulting from auto-ignition of end gases). For example, if cylinder number one is being evaluated for knock, then the rectified knock sensor signal may be integrated from 20 crankshaft degrees before top-dead-center compression stroke of cylinder number one to 50 crankshaft degrees after top-dead-center compression stroke of cylinder number one where engine vibrations from engine knock due to cylinder number one may be expected. The result of the integration is output from block 204 and input to block 206 and arithmetic block 208. The output of the integrator may be referred to as unscaled integration level results.

At block 206, integrated values of a plurality of rectified engine knock signals are filtered. In one example, the filter may be a rolling average filter that is performed via a controller. Alternatively, the filter may be a hardware filter. The output of the filter is a knock reference level that represents engine background noise and the rectified and integrated knock signal results corresponding to detected engine knocking events are not included in the computation of the filtered knock sensor output to avoid adapting the reference level to engine knocking noise. The rectified and integrated knock sensor signal is divided by the knock reference level at arithmetic block 208. Block 208 outputs an engine knock intensity value for the engine cylinder that is being evaluated for engine knock (e.g., for cylinder number one). The knock intensity level or value is then input to block 210 where it is compared to a threshold knock intensity level. If the knock intensity level is greater than the threshold knock intensity level, then knock is indicated for the engine cylinder that is presently being evaluated for engine knock. The indication may be in the form of a value of a variable in controller memory. For example, a variable KnK1 may store a value of 0 when knock for cylinder number one is not indicated and it may store a value of 1 when knock is indicated for cylinder number one. The knock sensor signal may be evaluated in a similar way for all engine cylinders to determine the presence or absence in all engine cylinders. If knock is indicated for a particular cylinder, the engine's controller may retard spark timing, cool the cylinder air charge via richening an air-fuel ratio of the cylinder in which knock was detected, or take other mitigating actions.

Referring now to FIG. 3, a block diagram 300 that describes a second method for operating an engine with a knock control system is shown. The block diagram of FIG. 3 includes some of the same blocks that are shown in FIG. 2. Blocks shown in FIG. 3 that have the same numbers as blocks shown in FIG. 2 operate as described in the description of FIG. 2. Therefore, for the sake of brevity, operation of blocks that are common to FIG. 2 will not be described again.

FIG. 3 includes block 304 which represents a gain lookup table or function that holds gain values (e.g., real numbers). The gain values may be referenced by engine speed and engine load. The gain values are input to block 302 where the unscaled integration level results are multiplied by the gain values to generate scaled integration level results. The gain values allow the scaled integration level results (output of block 302) to be normalized to a predetermined value (e.g., 1) even when the engine operates at different engine speeds and engine loads so that the threshold value does not have to change and so that values output from filter 206 are not disturbed even though output of the knock sensor may vary as engine speed and engine load vary.

While gain values stored in block 304 may allow the engine knock control system to detect engine knock even as engine speed and load change, the engine knock control system may not detect engine knock or may indicate engine knock if engine noise sources (e.g., direct injectors and poppet valves of variable valve timing systems) are activated/deactivated or change timing even when block 304 is included in the engine knock control system. Block 304 lacks capacity to compensate for engine noise sources that are not fixed in terms of their timing relative to engine crankshaft position at a given engine speed and load. For example, if unscaled integration level results are 0.1 on average without direct injectors being active at a particular engine speed and load and unscaled integration level results are 0.25 with direct fuel injectors being active at the same engine speed and load, then a gain of 10 will make the scaled integration level results equal to a value of one without direct fuel injectors being active, but it will also make the scaled integration level results equal 2.5 when the direct fuel injectors are activated. Consequently, if direct fuel injectors are activated or deactivated at an engine speed and engine load, then the knock control system may be forced to adapt out errors caused by activating/deactivating the direct fuel injectors. The adaptation of errors may compensate for the change in operating state of direct injectors; however, it may not be fast enough to prevent engine knock or false positive engine knock indications.

Referring now to FIG. 4, a block diagram 400 that describes a method for operating an engine with a knock control system according to the present description is shown. The block diagram of FIG. 4 includes some of the same blocks that are shown in FIGS. 2 and 3. Blocks shown in FIG. 4 that have the same numbers as blocks that are shown in FIGS. 2 and 3 operate as described in the descriptions of FIGS. 2 and 3. Therefore, for the sake of brevity, operation of blocks that are common to FIGS. 2 and 3 will not be described again.

Block diagram 400 includes a plurality of blocks 402, 408, and 414, which represent gain lookup tables or functions that holds gain values (e.g., real numbers). Although three gain blocks are shown, a greater number or lesser number of gain blocks may be provided. Blocks 402, 408, and 414 may be referenced individually via engine speed and engine load. Block 402 outputs a gain value to weighting block 404 where the gain from block 402 is multiplied by a weighting factor W1 (e.g., a real number). Likewise, block 408 outputs a gain value to weighting block 410 where the gain from block 408 is multiplied by a weighting factor W2 (e.g., a real number) and block 414 outputs a gain value to weighting block 416 where the gain from block 414 is multiplied by a weighting factor W3 (e.g., a real number). In one example, gain lookup table or function 402 holds gain values for engine operating conditions only when direct injectors do not open or close during the knock window of the cylinder being evaluated for knock. In other words, the gain values of table 402 compensate for an absence of direct fuel injector closings and direct fuel injector openings. Gain lookup table or function 408 holds gain values for engine operating conditions only when direct injectors open during the knock window of the cylinder being evaluated for knock. In other words, the gain values of table 408 compensate for only direct fuel injector openings. Gain lookup table or function 414 holds gain values for engine operating conditions only when direct injectors close during the knock window of the cylinder being evaluated for knock. In other words, the gain values of table 414 compensate for only direct fuel injector closings. Alternatively, gain lookup table or function 414 may holds gain values for engine operating conditions only when variable valve timing brings cylinder poppet valve closings during the knock window of the cylinder being evaluated for knock. In other words, the gain values of table 414 compensate for only poppet valve closings.

The result of the gain value output from table 414 multiplied by weighting factor W3 is output from block 416 and input to summing junction 412. Likewise, the result of the gain value output from table 408 multiplied by weighting factor W2 is output from block 410 and input to summing junction 412. A sum of the output from block 416 and the output from block 410 is output from summing junction 412 and input into summing junction 406. The result of the gain value output from table 402 multiplied by weighting factor W1 is output from block 404 and input to summing junction 406. A sum of the output from block 412 and the output from block 404 is output from summing junction 406 and input into block 302.

At block 302 the unscaled integration level results are multiplied by the weighted sum of the gains to generate a scaled integrated level result that may be based on engine noise that is based on direct injection, engine noise that is based on variable poppet valve timing, and engine background noise that is not based on direct injection or variable poppet valve timing. The output of block 302 is processed as previously described. The scaled integration level result according to the method of block diagram 400 may be expressed as:

$$ILR = ((W1 \times gain(1)) + (W2 \times gain(2)) + (W3 \times gain(3))) \times UILR$$

where ILR is the scaled integration level results, W1 is the W1 gain, gain (1) is gain output of block 402, W2 is the W2 gain, gain (2) is gain output of block 408, W3 is the W3 gain, gain (3) is gain output of block 414, and UIRL is the unscaled integration level result.

The following is one example of the method of block diagram 400. In this case, tables 402 and 408 are applied to scale the knock sensor input and table 414 is not included. If the unscaled integration level result value is 0.1 when direct fuel injector noise is not included in a knock window of a cylinder being evaluated for knock, then a gain value of 10 (output from table 402 G1) is needed to adjust the scaled integration level result to a value of 1 when direct injector noise is not within the knock window of the cylinder being evaluated for knock. If the unscaled integration level result value is 0.25 when direct fuel injector noise is 100% included in a knock window of a cylinder being evaluated for knock, then a gain value of 4 (output from table 408 G2) is needed to adjust the scaled integration level result to a value of 1 when direct injector noise is 100% within the knock window of the cylinder being evaluated for knock. If noise from the direct injector is determined to be 80% within the knock window, then the weighting factor W1 applied to gain G1 (output of table 402) may be adjusted to a value of 0.2 (portion of direct fuel injector nose that is not present in the knock window or is outside of the knock window) and the weighting factor W2 applied to gain G2 (output of table 408) may be adjusted to a value of 0.8 (portion of the direct fuel injector noise that is present in or inside of the knock window). The unscaled integration result level is then (0.2× 0.1)+(0.8×0.25)=0.22, where 0.2 is the portion of the direct fuel injector noise that is outside of the knock window, 0.1 is the unscaled integration level result with no direct fuel injector noise, 0.8 is the portion of the direct fuel injector noise that is inside of the knock window, and 0.25 is the unscaled integration result level when direct fuel injector noise is 100% present within the knock window of the cylinder being evaluated for knock. The weighted gain is then (W1×G1)+(W2×G2)=5.2, which may be applied to provide a scaled integrated result level of 5.2×0.22=1.144. This is close but not equal to a desired value of 1; however, it is an improvement over applying only gain G1: 10×0.22=2.2.

Gain compensation for direct fuel injector noise and poppet valve noise may be referenced relative to the engine knock window as previously described. Consider a direct injector noise disturbance that is wider than the knock window. For example, a 50 crankshaft degree wide direct injector noise versus a 45 crankshaft degree wide knock window. The portion of the knock window where DI noise is present can be 100% in this case, but not the whole portion of the direct injector noise is inside the knock window (i.e. W2<1). Also, the portion of the direct injector noise that is inside the knock window is not defined by the ratio of duration of the direct injector noise that is inside the knock window divided by the total duration of direct injector noise (i.e. W2≠45/50), but more accurately by the ratio of energy of the portion of the direct injector noise inside the window divided by the total direct injector noise energy (noise energy per crankshaft angle degrees is expected to decay with time so that there's more energy in the first 10 degrees of the DI noise as compared to the second 10 degrees of direct injector noise energy).

The gain weights (e.g., W1, W2, etc.) are a function of the portion or fraction of the noise (e.g. direct injector opening noise) present inside the knock window. Specifically, the fraction of the noise present inside the knock window is defined as the ratio of the contribution of the noise present inside the knock window to the rectified/integrated knock sensor output divided by the contribution of the noise to the rectified/integrated knock sensor output if all the noise was present inside the window. This may be equivalent to the ratio of the energy of the portion of the noise present inside the knock window divided by the total noise energy.

For example, assuming the noise (e.g. direct injector or poppet valve noise) can be modelled as a decaying expo-nential, then the noise contribution to the rectified/integrated knock sensor output ($IRL_{Noise}$) can be modelled using:

$$IRL_{Noise} = A\exp\left(\min\left\{\frac{\delta t_s}{\tau}, 0\right\}\right) - A\exp\left(\min\left\{\frac{\delta t_e}{\tau}, 0\right\}\right)$$

where A is the noise amplitude, $\delta t_s$ is timing of the event causing the noise relative to the knock window start (e.g. for direct injector opening noise, $\delta t_{SOI} - t_{Knk\ Win\ start}$) ($\delta t_e$ is timing of the event causing the noise relative to the knock window end (e.g. for direct injector opening noise, $\delta t_e = t_{SOI} - t_{Knk\ Win\ End}$), and r is the time constant determining the rate of exponential decay. If all the noise is present inside the knock window, then $IRL_{Noise}$ is equal to A. The fraction of the noise present inside the knock window can then be computed as the ratio of $IRL_{Noise}$ divided by A:

$$f_{Noise} = \exp\left(\min\left\{\frac{\delta t_s}{\tau}, 0\right\}\right) - \exp\left(\min\left\{\frac{\delta t_e}{\tau}, 0\right\}\right)$$

Note: Knowledge of the noise magnitude A is not required as it cancels out. If multiple noises of the same type are present inside the knock window (e.g. multiple direct injector opening noises interfering with the same knock window when split injections are used), then the total fraction of the noise present in the knock window is the sum of the individual fractions of the noises of the same type present inside the knock window.

Once the fraction of the noise present inside the knock window is known, the weights for the gain tables can be computed. In one example, if the first table (e.g., 402) corresponds to the noise level with zero direct injector interference, and the second table (e.g., 408) corresponds to total noise level with 100% direct injector interference, then $W1 = 1 - f_{DI}$ and $W2 = f_{DI}$. In another example, if the first table corresponds to the noise level with zero direct injector interference, and the second table corresponds to the incremental change in noise level due to 100% direct injector interference, then $W1 = 1$ and $W2 = f_{DI}$.

The faction of noise present in the knock window may also be used to trigger temporary desensitization of the knock detection algorithm (temporarily faster low-pass/rolling-average adaption of the reference level, temporarily increased knock detection thresholds, or temporarily reinitialize the reference level). Speed of the filter may be increased via decreasing a total number of values input to the filter. For example, a base averaging filter may average one present and six past values of rectified and integrated knock signal levels. The speed may be increased via reducing the average to one present and two past values of rectified and integrated knock signal levels. The filter speed may be decreased via adding past rectified and integrated knock signal levels to the averaging filter.

If $f_{Noise} \geq 1^{st}$ threshold or $f_{Noise} \leq 2^{nd}$ threshold, temporarily desensitize the knock detection algorithm.

And/or if rate of change of $f_{Noise}$ with respect to time, $df_{Noise}/dt \geq 3^{rd}$ threshold, temporarily desensitize the knock detection algorithm.

Gain table adaption (e.g., adapting values in the gain tables (402, 408, 412, etc.) may be performed by comparing the scaled integration level result to a desired threshold level (e.g., 1) and a value in a table cell that corresponds to the present engine speed and engine load is decremented or incremented if the scaled integration level result is below or above the desired threshold level by greater than a threshold amount. Where multiple gain tables are provided as shown in FIGS. 4-6, adaption of values of a particular table may only be permitted if its corresponding weight is greater than a threshold. For example, a gain value stored in table 402 for a particular engine speed and engine load may be adapted only when the value of weighting W1>0.9.

Referring now to FIG. 5, a block diagram 500 that describes a method for operating an engine with a knock control system according to the present description is shown. The block diagram of FIG. 5 includes some of the same blocks that are shown in FIGS. 2-4. Blocks shown in FIG. 5 that have the same numbers as blocks that are shown in FIGS. 2-4 operate as described in the descriptions of FIGS. 2-4. Therefore, for the sake of brevity, operation of blocks that are common to FIGS. 2-4 will not be described again.

Block diagram 500 includes reciprocal blocks 502, 504, 506, and 508. The output of these blocks is the reciprocal of the input to these blocks. For example, if the output of block 402 is 10, then block 506 outputs a value of 1/10. Block 506 provides its output to the input of block 404 such that the reciprocal of the output of block 402 is multiplied by the weighting factor W1 (e.g., a real number). The output of weighting block 404 is then input to summing junction 406. Likewise, block 504 provides its output to the input of block 410 such that the reciprocal of the output of block 408 is multiplied by the weighting factor W2 (e.g., a real number). The output of weighting block 410 is input to summing junction 412. Block 502 provides its output to the input of block 416 such that the reciprocal of the output of block 414 is multiplied by the weighting factor W3 (e.g., a real number). The output of weighting block 416 is input to summing junction 412. The sum of output of weighting blocks 416 and 410 is output from block 412 and input to block 406. The sum of weighting blocks 404, 410, and 416 is output from summing junction 406 and input to reciprocal block 508. The output of reciprocal block 508 is multiplied by the unscaled integration level result at gain block 302.

The scaled integration level result according to the method of block diagram 400 may be expressed as:

$$ILR = \frac{1}{\left(W1 \times \frac{1}{gain(1)}\right) + \left(W2 \times \frac{1}{gain(2)}\right) + \left(W3 \times \frac{1}{gain(3)}\right)} \times UILR$$

where ILR is the scaled integration level results (output of block 302), W1 is the W1 gain, gain (1) is gain output of block 402, W2 is the W2 gain, gain (2) is gain output of block 408, W3 is the W3 gain, gain (3) is gain output of block 414, and UILR is the unscaled integral level result output of block 204.

The following is one example of the method of block diagram 500. In this case, tables 402 and 408 are applied to scale the knock sensor input and table 414 is not included. If the unscaled integration level result value is 0.1 when direct fuel injector noise is not included in a knock window of a cylinder being evaluated for knock, then a gain value of 10 (output from table 402 G1) is needed to adjust the scaled integration level result to a value of 1 when direct injector noise is not within the knock window of the cylinder being evaluated for knock. If the unscaled integration level result value is 0.25 when direct fuel injector noise is 100% included in a knock window of a cylinder being evaluated for knock, then a gain value of 4 (output from table 408 G2) is needed to adjust the scaled integration level result to a value of 1 when direct injector noise is 100% within the knock window of the cylinder being evaluated for knock. If noise from the direct injector is determined to be 80% within the knock window, then the weighting factor W1 applied to gain G1 (output of table 402) may be adjusted to a value of 0.2 and the weighting factor W2 applied to gain G2 (output of table 408) may be adjusted to a value of 0.8. The unscaled integration result level is then (0.2×0.1)+(0.8×0.25)=0.22, where 0.2 is the portion of direct injector noise that is outside of the knock window, 0.1 is the unscaled integration level result with no direct fuel injector noise, 0.8 is the portion of the direct injector noise that is inside of the knock window, and 0.25 is the unscaled integration result level when direct fuel injector noise is 100% present within the knock window of the cylinder being evaluated for knock. The weighted gain is then $$\frac{1}{\frac{W1}{G1} + \frac{W2}{G2}} = \frac{1}{\frac{0.2}{10} + \frac{0.8}{4}} = \frac{50}{11} \approx 4.5454,$$

which may be applied to provide a scaled integrated result level of 50/11×0.22=1.

Referring now to FIG. 6, a block diagram 600 that describes a method for operating an engine with a knock control system according to the present description is shown. The block diagram of FIG. 6 includes some of the same blocks that are shown in FIGS. 2-4. Blocks shown in FIG. 6 that have the same numbers as blocks that are shown in FIGS. 2-4 operate as described in the descriptions of FIGS. 2-4. Therefore, for the sake of brevity, operation of blocks that are common to FIGS. 2-4 will not be described again.

Block diagram 600 includes gain blocks 602 and 604 in addition to gain block 302. Block diagram also includes reciprocal blocks 606, 608, 610, and 622 as well as weighting blocks 612, 614, and 616. Further, block diagram includes summing junction blocks 618 and 620.

A gain value that is output from block 414 is input to gain block 602, which multiplies the unscaled integration level result (output of block 204) by the output of block 414. The output of block 602 is input to block 606 and block 606 generates the reciprocal of the output of block 414 multiplied by the output of block 204. The output of block 606 is multiplied by a weighting factor W3 (a real number) at block 612 such that block 612 outputs a weighted reciprocal of the output of block 414 multiplied by the output of block 204 to an input of summing junction 618.

A gain value that is output from block 408 is input to gain block 604, which multiplies the unscaled integration level result (output of block 204) by the output of block 408. The output of block 604 is input to block 608 and block 608 generates the reciprocal of the output of block 408 multiplied by the output of block 204. The output of block 608 is multiplied by a weighting factor W2 (a real number) at block 614 such that block 614 outputs a weighted reciprocal of the output of block 408 multiplied by the output of block 204 to an input of summing junction 618.

A gain value that is output from block 402 is input to gain block 302, which multiplies the unscaled integration level result (output of block 204) by the output of block 402. The output of block 302 is input to block 610 and block 610 generates the reciprocal of the output of block 402 multiplied by the output of block 204. The output of block 610 is multiplied by a weighting factor W1 (a real number) at block 616 such that block 616 outputs a weighted reciprocal of the output of block 402 multiplied by the output of block 204 to an input of summing junction 620.

The output of summing junction 618 is a sum of the weighted reciprocal of the multiplication of the output of block 414 with the output of block 204 and the weighted reciprocal of the multiplication of the output of block 408 with the output of block 204. The output of summing junction 620 is a sum of the output of summing block 618 and the weighted reciprocal of the multiplication of the output of block 402 with the output of block 204. The output of summing block 620 is input to reciprocal block 622, which generates the reciprocal of the output of block 620. The output of reciprocal block 622 is input to filter block 206 and block 208 for processing as previously described.

The scaled integration level result according to the method of block diagram 400 (the output of block 622) may be expressed as:

$$ILR = \frac{1}{\left(W1 \times \frac{1}{\text{gain}(1) \times UILR}\right) + \left(W2 \times \frac{1}{\text{gain}(2) \times UILR}\right) + \left(W3 \times \frac{1}{\text{gain}(3) \times UILR}\right)}$$

where ILR is the scaled integration level results (output of block 622), W1 is the W1 gain, gain (1) is gain output of block 402, W2 is the W2 gain, gain (2) is gain output of block 408, W3 is the W3 gain, gain (3) is gain output of block 414, and UILR is the unscaled integral level result output of block 204.

It should be noted that the arrows shown in FIGS. 2-6 indicate the direction of data flow in the block diagrams. The arrow heads are the location of inputs to the various blocks and the tails (beginning) of the arrows are the locations of outputs of the various blocks.

The methods of the block diagrams shown in FIGS. 2-6 may be included in and may cooperate with the system of FIG. 1. At least portions of the methods shown in FIGS. 2-6 may be incorporated in the system of FIG. 1 as executable instructions stored in non-transitory memory. In addition, other portions of the methods of FIGS. 2-6 may be performed via a controller transforming operating states of devices and actuators in the physical world. The controller may employ engine actuators of the engine system to adjust engine operation.

Referring now to FIG. 7, a method for providing engine knock detection dynamic gains is shown. The method of FIG. 7 may be included in and may cooperate with the system of FIG. 1. At least portions of method 700 may be incorporated in the system of FIG. 1 as executable instructions stored in non-transitory memory. In addition, other portions of method 200 may be performed via a controller transforming operating states of devices and actuators in the physical world. The controller may employ engine actuators of the engine system to adjust engine operation.

At 702, method 700 receives signal data from a knock sensor. Method 700 rectifies and integrates the signal data within predetermined crankshaft angle windows (e.g., 20-50 degrees after top-dead-center compression stroke for the cylinder being evaluated for engine knock) for each engine cylinder. One knock window is provided for each cylinder that is being evaluated for engine knock. These operations are shown in FIGS. 4-6 at blocks 202 and 204. Method 700 proceeds to 704.

At 704, method 700 determines gains for rectified and integrated knock sensor signals. The gains may be determined as described in the descriptions of FIGS. 4-6. The gains may be values that are a function of unscaled integrated level results. In particular, the gains may be values that scale the unscaled integrated level results to a value of one. Gain values may be provided for knock sensor signals that do not include direct fuel injector noise and poppet valve noise during the knock window crankshaft interval. Gain values may also be provided for knock sensor signals that do include direct fuel injector opening noise during the knock window crankshaft interval and do not include poppet valve closing and direct fuel injector closing noise during the knock window. Gain values may also be provided for knock sensor signals that do include direct fuel injector closing noise during the knock window crankshaft interval and do not include poppet valve closing and direct fuel injector opening noise during the knock window. In addition, gain values may be provided for knock sensor signals that include poppet valve closing noise due to variable valve timing during the knock window crankshaft interval and that do not include fuel injector noise during the knock window crankshaft interval. Method 700 proceeds to 706.

At 706, method adjusts the gains for the scaled integrated level results via weighting factors for each table that outputs a gain value. Values for the weighting factors may be determined as a function of portions of the direct fuel injector closing noise inside the knock window, portions of the direct fuel injector opening noise inside the knock window, and portions of the poppet valve closing noise inside the knock window as discussed with regard to FIGS. 4-6. In one example, method 700 multiplies each of the gains for the scaled integrated level results (e.g., outputs of tables 402, 408, and 414) by a weighting factor as described in one of FIGS. 4-6. Method 700 proceeds to 708.

At 708, method 700 sums the weighted gains for the rectified and integrated knock sensor signals. Method 700 may sum the weighted gains as described in one of FIGS. 4-6. Method 700 proceeds to 710.

At 710, method 700 adjusts the rectified and integrated knock sensor signal via the sums of the weighted gains. Method 700 may adjust the rectified integrated knock sensor signals as described in FIGS. 4-6. Method 700 proceeds to 712.

At 712, method 700 determines a presence or absence of knock in a cylinder that is being evaluated for knock. In one example, method 700 may filter the scaled integrated level results and divide the scaled integrated level results by the filtered integrated level results as described in FIGS. 3-6. If the result of the division is greater than a threshold value, method 700 may indicate knock is present in the cylinder that is being evaluated for knock. Method 700 proceeds to 714.

At 714, method 700 judges if knock is detected. If so, the answer is yes and method 700 proceeds to 716. Otherwise, the answer is no and method 700 proceeds to exit.

At 716, method 700 adjusts engine operation to mitigate engine knock. In one example, method 700 may retard spark timing in the cylinder that knock is indicated in. Further, method 700 may richen an air-fuel ratio of the cylinder that knock is indicated in to reduce the possibility of knock. Method 700 proceeds to exit after mitigating actions have been taken.

Thus, the method of FIGS. 4-7 provide for

An engine operating method, comprising: adjusting a rectified and integrated engine knock sensor signal via output of a plurality of gain tables or functions; indicating a presence or an absence of engine knock based on output of the plurality of gain tables or functions; and adjusting an engine actuator to reduce a possibility of engine knock via a controller in response to the presence of engine knock. The method includes where adjusting an engine actuator includes retarding spark timing. The method includes where the plurality of gain tables or functions includes a table or function that includes gain values to compensate for only direct fuel injector openings. The method includes where the plurality of gain tables or functions includes a table or function that includes gain values to compensate for only direct fuel injector closings. The method includes where the plurality of gain tables or functions includes a table or function that includes gain values to compensate for only variable cam timing adjustments. The method includes where the plurality of gain tables or functions includes a table or function that includes gain values to compensate for an absence of direct fuel injector closings and direct fuel injector openings. The method includes where each of the plurality of gain tables or functions is referenced via engine speed and engine load. The method includes where indicating the presence of engine knock is further based on a knock intensity level being greater than a threshold level.

The methods of FIGS. 4-7 also provide for an engine operating method, comprising: generating a plurality of outputs from a plurality of tables or functions via a controller; multiplying each of the outputs via a weighting factor to generate a plurality of weighted gains via the controller; summing the plurality of weighted gains via the controller; adjusting a rectified and integrated knock sensor signal via the sum of the plurality of weighted gains via the controller; and adjusting operation of an engine in response to the adjusted rectified and integrated knock sensor signal. The method includes where adjusting the rectified and integrated knock sensor signal includes multiplying the rectified and integrated knock sensor signal by the sum of the plurality of weighted gains via the controller. The method further comprises referencing the plurality of tables or functions via engine speed and engine load. The method includes where adjusting the rectified and integrated knock sensor signal includes adjusting the rectified and integrated knock sensor signal to a value of one. The method includes where multiplying each of the outputs via a weighting factor includes multiplying each of the outputs via a unique weighting factor. The method includes where adjusting operation of the engine includes adjusting engine spark timing.

Thus, it may be advantageous to include gain tables representing changes in the knock sensor output level when multiple noise sources are present by generating one additional table for each additional noise source. If instead, the tables represent a total noise level being compensated, then multiple additional tables for each possible combination of noises present may be provided (e.g. table 1 for zero interference, table 2 for direct injector (DI) only interference present, table 3 for intake valve closing o(IVC) only interference present, and table 4 for both DI and IVC interferences present vs. table 1 for zero interference, table 2 for change due to DI interference, and table 3 for change due to IVC interference).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but it is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
adjusting a rectified and integrated engine knock sensor signal via output of a plurality of gain tables or functions;
indicating a presence or an absence of engine knock based on output of the plurality of gain tables or functions; and
adjusting an engine actuator to reduce a possibility of engine knock via a controller in response to the presence of engine knock.

2. The method of claim 1, where adjusting an engine actuator includes retarding spark timing.

3. The method of claim 1, where the plurality of gain tables or functions includes a table or function that includes gain values to compensate for only direct fuel injector openings.

4. The method of claim 1, where the plurality of gain tables or functions includes a table or function that includes gain values to compensate for only direct fuel injector closings.

5. The method of claim 1, where the plurality of gain tables or functions includes a table or function that includes gain values to compensate for only variable cam timing adjustments.

6. The method of claim 1, where the plurality of gain tables or functions includes a table or function that includes gain values to compensate for an absence of direct fuel injector closings and direct fuel injector openings.

7. The method of claim 1, where each of the plurality of gain tables or functions is referenced via engine speed and engine load.

8. The method of claim 1, where indicating the presence of engine knock is further based on a knock intensity level being greater than a threshold level.

9. A system for operating an engine, comprising:
an engine including a knock sensor; and
a controller including executable instructions stored in non-transitory memory that cause the controller to adjust a rectified and integrated signal output from the knock sensor in response to output of a plurality of weighted outputs of gain tables or functions and indicate a presence or absence of engine knock based on the plurality of weighted outputs of gain tables or functions.

10. The system of claim 9, further comprising additional instructions that cause the controller to adjust operation of the engine in response to the presence of engine knock.

11. The system of claim 10, where adjusting operation of the engine includes adjusting engine spark timing.

12. The system of claim 9, further comprising additional instructions to sum output of the plurality of weighted outputs of the gain tables or functions.

13. The system of claim 12, further comprising additional instructions that cause the controller to generate a result via multiplying the sum output of the plurality of weighted outputs of the gain tables or functions with the rectified and integrated signal output from the knock sensor.

14. The system of claim 13, further comprising additional instructions to filter the result and divide the result by the filtered result.

15. An engine operating method, comprising:
generating a plurality of outputs from a plurality of tables or functions via a controller;
multiplying each of the outputs via a weighting factor to generate a plurality of weighted gains via the controller;
summing the plurality of weighted gains via the controller;
adjusting a rectified and integrated knock sensor signal via the sum of the plurality of weighted gains via the controller; and
adjusting operation of an engine in response to the adjusted rectified and integrated knock sensor signal.

16. The method of claim 15, where adjusting the rectified and integrated knock sensor signal includes multiplying the rectified and integrated knock sensor signal by the sum of the plurality of weighted gains via the controller.

17. The method of claim 15, where the weighting factor is a function of a portion of a noise signal present inside of a knock window, and further comprising:
referencing the plurality of tables or functions via engine speed and engine load.

18. The method of claim 15, where adjusting the rectified and integrated knock sensor signal includes adjusting the rectified and integrated knock sensor signal to a value of one and further comprising:
adapting values in at least one of the plurality of tables according to a fraction of a noise signal being present in a knock window.

19. The method of claim 15, where multiplying each of the outputs via a weighting factor includes multiplying each of the outputs via a unique weighting factor.

20. The method of claim 15, where adjusting operation of the engine includes adjusting engine spark timing.

* * * * *